United States Patent
Becker et al.

(10) Patent No.: US 10,969,858 B2
(45) Date of Patent: Apr. 6, 2021

(54) OPERATION PROCESSING CONTROLLED ACCORDING TO DIFFERENCE IN CURRENT CONSUMPTION

(71) Applicant: Apple Inc., Cupertino, CA (US)

(72) Inventors: Daniel U. Becker, San Jose, CA (US); Aditya Kesiraju, Los Gatos, CA (US); Srikanth Balasubramanian, Santa Clara, CA (US); Venkatram Krishnaswamy, Los Altos, CA (US); Boris S. Alvarez-Heredia, Redwood City, CA (US)

(73) Assignee: Apple Inc., Cupertino, CA (US)

( * ) Notice: Subject to any disclaimer, the term of this patent is extended or adjusted under 35 U.S.C. 154(b) by 146 days.

(21) Appl. No.: 16/238,984

(22) Filed: Jan. 3, 2019

(65) Prior Publication Data

US 2020/0218327 A1    Jul. 9, 2020

(51) Int. Cl.
G06F 1/26    (2006.01)
G06F 1/32    (2019.01)
G06F 1/329   (2019.01)

(52) U.S. Cl.
CPC .................................. *G06F 1/329* (2013.01)

(58) Field of Classification Search
CPC ... G06F 1/32; G06F 9/3867; G06F 2207/3884
See application file for complete search history.

(56) References Cited

U.S. PATENT DOCUMENTS

| | | | |
|---|---|---|---|
| 5,898,877 A * | 4/1999 | Miura | G06F 9/3861 |
| | | | 710/260 |
| 6,539,008 B1 | 3/2003 | Ahn et al. | |
| 6,564,328 B1 * | 5/2003 | Grochowski | G06F 1/3203 |
| | | | 712/E9.049 |
| 6,651,176 B1 | 11/2003 | Soltis, Jr. et al. | |
| 7,174,469 B2 | 2/2007 | Luick | |
| 7,937,563 B2 | 5/2011 | Naffziger et al. | |
| 8,510,582 B2 | 8/2013 | Naffziger et al. | |
| 8,650,413 B2 | 2/2014 | Bose et al. | |
| 8,650,428 B2 | 2/2014 | Bajic et al. | |
| 8,788,779 B1 | 7/2014 | Horn | |
| 8,924,758 B2 | 12/2014 | Steinman et al. | |
| 9,069,555 B2 | 6/2015 | Fetzer et al. | |
| 9,606,602 B2 | 3/2017 | Suryanarayanan et al. | |
| 9,703,354 B2 | 7/2017 | Lee et al. | |
| 9,798,375 B1 | 10/2017 | Becker | |
| 9,817,469 B2 | 11/2017 | Lee | |
| 9,971,390 B1 | 5/2018 | Becker | |
| 10,452,117 B1 * | 10/2019 | Becker | G06F 1/329 |

(Continued)

*Primary Examiner* — Xuxing Chen
(74) *Attorney, Agent, or Firm* — Kowert, Hood, Munyon, Rankin & Goetzel, P.C.; Lawrence J. Merkel

(57) ABSTRACT

In an embodiment, a power control circuit for an execute circuit is configured to monitor power consumption of operations in a pipeline of the execute circuit and potential changes in power consumption if new operations are issued into the pipeline. The power control circuit may be configured to inhibit issuance of a given operation if the change in power consumption is greater than a maximum increase. A decaying average of previous power consumptions may be maintained and compared to the potential increase in power consumption to control the rate of change in power consumption over time.

20 Claims, 7 Drawing Sheets

(56) References Cited

U.S. PATENT DOCUMENTS

| | | |
|---|---|---|
| 2006/0064679 A1* | 3/2006 | Ozaki ................ G06F 9/30189 717/127 |
| 2008/0263373 A1 | 10/2008 | Meier et al. |
| 2009/0089602 A1 | 4/2009 | Bose et al. |
| 2013/0151869 A1 | 6/2013 | Steinman et al. |
| 2013/0339757 A1 | 12/2013 | Reddy |
| 2014/0143558 A1 | 5/2014 | Kuesel et al. |
| 2014/0181503 A1 | 6/2014 | Bettink et al. |
| 2014/0317428 A1 | 10/2014 | Lin et al. |
| 2014/0380075 A1 | 12/2014 | Lee |
| 2015/0089254 A1 | 3/2015 | Burns et al. |
| 2015/0185813 A1 | 7/2015 | Ping et al. |
| 2017/0357302 A1 | 12/2017 | Dorsey et al. |

* cited by examiner

OPERATION PROCESSING CONTROLLED ACCORDING TO DIFFERENCE IN CURRENT CONSUMPTION

BACKGROUND

Technical Field

Embodiments described herein are related to pipelined processing of operations and, more particularly, to controlling processing of operations to limit changes in current consumption in the processing.

Description of the Related Art

Integrated circuits continue to increase in density as semiconductor manufacturing processes improve, allowing for increased functionality on a single integrated circuit "chip." A challenge presented by the continued increases in density is controlling the power consumption of the circuitry so that the power supply to the integrated circuit (and the infrastructure within the integrated circuit to distribute the power) is not overwhelmed. Excessive power consumption can cause the supply voltage to droop, which can cause malfunctions in the integrated circuit. Additionally, rapid changes in the power consumption can similarly cause supply voltage droop, even if the power consumption itself is not exceeding the capabilities of the power supply and/or infrastructure. Controlling both maximum power consumption and rate of change of power consumption can be critical to ensuring proper operation of an integrated circuit.

SUMMARY

In an embodiment, a power control circuit for an execute circuit is configured to monitor power consumption of operations in a pipeline of the execute circuit and potential changes in power consumption if new operations are issued into the pipeline. The power control circuit may be configured to inhibit issuance of a given operation if the change in power consumption is greater than a maximum increase. A decaying average of previous power consumptions may be maintained and compared to the potential increase in power consumption to control the rate of change in power consumption over time.

BRIEF DESCRIPTION OF THE DRAWINGS

The following detailed description makes reference to the accompanying drawings, which are now briefly described.

Figure 1:
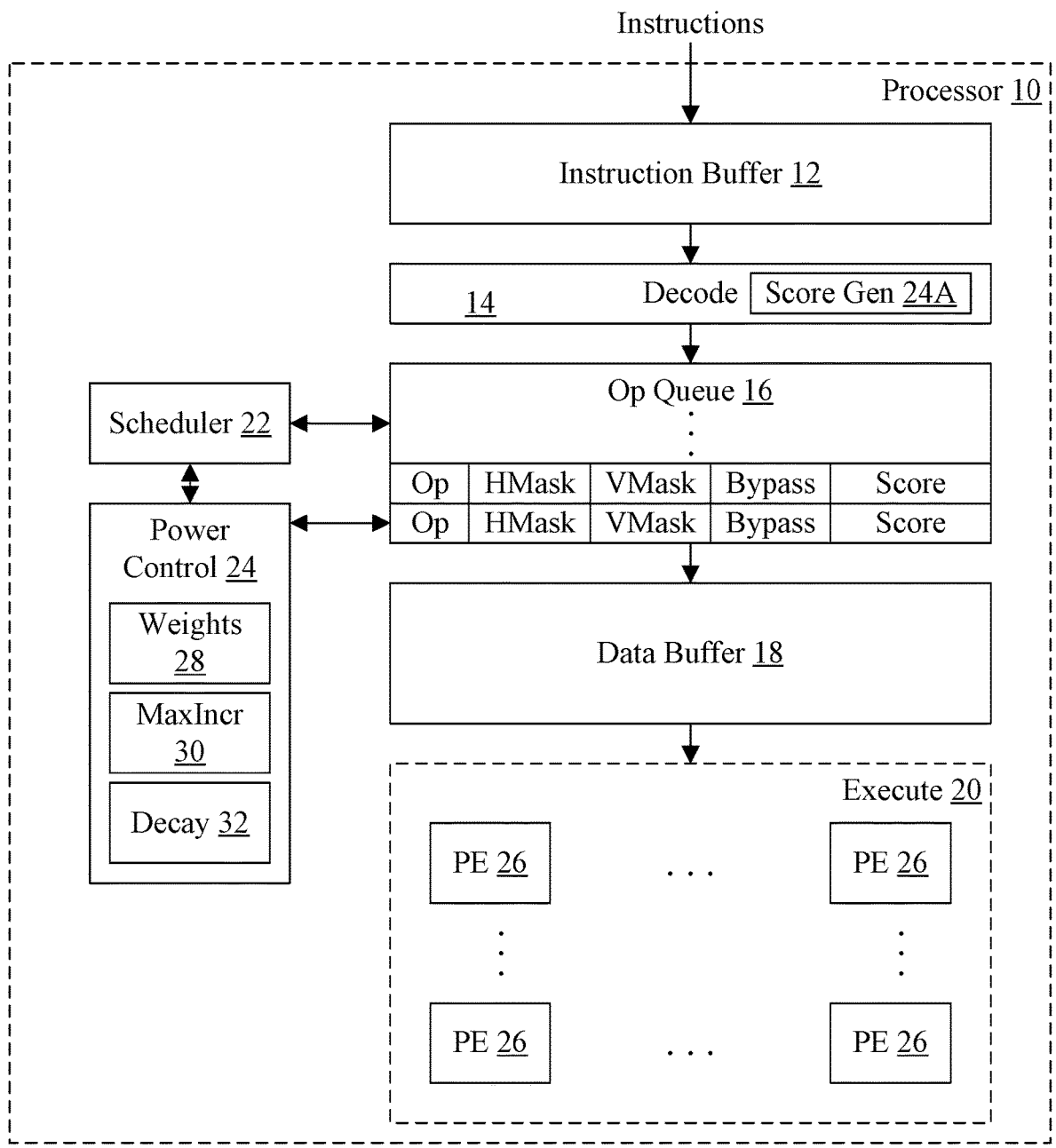
FIG. 1 is a block diagram of one embodiment of a processor.

While embodiments described in this disclosure may be susceptible to various modifications and alternative forms, specific embodiments thereof are shown by way of example in the drawings and will herein be described in detail. It should be understood, however, that the drawings and detailed description thereto are not intended to limit the embodiments to the particular form disclosed, but on the contrary, the intention is to cover all modifications, equivalents and alternatives falling within the spirit and scope of the appended claims. The headings used herein are for organizational purposes only and are not meant to be used to limit the scope of the description. As used throughout this application, the word "may" is used in a permissive sense (i.e., meaning having the potential to), rather than the mandatory sense (i.e., meaning must). Similarly, the words "include", "including", and "includes" mean "including, but not limited to." As used herein, the terms "first," "second," etc. are used as labels for nouns that they precede, and do not imply any type of ordering (e.g., spatial, temporal, logical, etc.) unless specifically stated.

Within this disclosure, different entities (which may variously be referred to as "units," "circuits," other components, etc.) may be described or claimed as "configured" to perform one or more tasks or operations. This formulation—[entity] configured to [perform one or more tasks]—is used herein to refer to structure (i.e., something physical, such as an electronic circuit). More specifically, this formulation is used to indicate that this structure is arranged to perform the one or more tasks during operation. A structure can be said to be "configured to" perform some task even if the structure is not currently being operated. A "clock circuit configured to generate an output clock signal" is intended to cover, for example, a circuit that performs this function during operation, even if the circuit in question is not currently being used (e.g., power is not connected to it). Thus, an entity described or recited as "configured to" perform some task refers to something physical, such as a device, circuit, memory storing program instructions executable to implement the task, etc. This phrase is not used herein to refer to something intangible. In general, the circuitry that forms the structure corresponding to "configured to" may include hardware circuits. The hardware circuits may include any combination of combinatorial logic circuitry, clocked storage devices such as flops, registers, latches, etc., finite state machines, memory such as static random access memory or embedded dynamic random access memory, custom designed circuitry, analog circuitry, programmable logic arrays, etc. Similarly, various units/circuits/components may be described as performing a task or tasks, for convenience in the description. Such descriptions should be interpreted as including the phrase "configured to."

The term "configured to" is not intended to mean "configurable to." An unprogrammed FPGA, for example, would not be considered to be "configured to" perform some specific function, although it may be "configurable to" perform that function. After appropriate programming, the FPGA may then be configured to perform that function.

Reciting in the appended claims a unit/circuit/component or other structure that is configured to perform one or more tasks is expressly intended not to invoke 35 U.S.C. § 112(f) interpretation for that claim element. Accordingly, none of the claims in this application as filed are intended to be interpreted as having means-plus-function elements. Should Applicant wish to invoke Section 112(f) during prosecution, it will recite claim elements using the "means for" [performing a function] construct.

In an embodiment, hardware circuits in accordance with this disclosure may be implemented by coding the description of the circuit in a hardware description language (HDL) such as Verilog or VHDL. The HDL description may be synthesized against a library of cells designed for a given integrated circuit fabrication technology, and may be modified for timing, power, and other reasons to result in a final design database that may be transmitted to a foundry to generate masks and ultimately produce the integrated circuit. Some hardware circuits or portions thereof may also be custom-designed in a schematic editor and captured into the integrated circuit design along with synthesized circuitry. The integrated circuits may include transistors and may further include other circuit elements (e.g. passive elements such as capacitors, resistors, inductors, etc.) and interconnect between the transistors and circuit elements. Some embodiments may implement multiple integrated circuits coupled together to implement the hardware circuits, and/or discrete elements may be used in some embodiments. Alternatively, the HDL design may be synthesized to a programmable logic array such as a field programmable gate array (FPGA) and may be implemented in the FPGA.

As used herein, the term "based on" or "dependent on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

This specification includes references to various embodiments, to indicate that the present disclosure is not intended to refer to one particular implementation, but rather a range of embodiments that fall within the spirit of the present disclosure, including the appended claims. Particular features, structures, or characteristics may be combined in any suitable manner consistent with this disclosure.

DETAILED DESCRIPTION OF EMBODIMENTS

FIG. 1 is a block diagram of one embodiment of a processor 10. In the illustrated embodiment, the processor 10 includes an instruction buffer 12, a decode unit 14, an operation (op) queue 16, a data buffer 18, an execute circuit 20, a scheduler circuit 22, and a power control circuit 24. The instruction buffer 12 is coupled to receive instructions to be executed by the processor 10, and is coupled to the decode unit 14. The decode unit 14 is coupled to the op queue 16, which is further coupled to the data buffer 18. The data buffer 18 is coupled to the execute circuit 20. The scheduler circuit 22 is coupled to the op queue 16 and the power control circuit 24, which is also coupled to the op queue 16. In some embodiments, circuits may be coupled if they are electrically coupled (e.g. directly connected or indirectly connected through one or more other circuits) and/or communicatively coupled.

Generally, the processor 10 may be configured to receive instructions in the instruction buffer 12. The decode unit 14 may decode the instructions into one or more operations (ops) for execution. The ops may include compute ops that are executed in the execute circuit 20, as well as memory ops to read data from memory into the data buffer 18 and store data from the data buffer 18 to memory. In one embodiment, the data buffer 18 may be the source of operands for compute ops executed by the execute circuit 20, and results may be stored in a second data buffer that is distributed within the execute circuit 20 (not shown in FIG. 1). In other embodiments, results may be written to the data buffer 18 as well.

The processor 10 may be designed to execute instructions which specify vectors of operands and a compute operation to be performed on the operands. For example, various types of multiply/accumulate operations may be supported. The multiplications may be performed in parallel on the vectors of operands. Thus, the execute circuit 20 includes an array of processing elements (PEs) 26. The array of PEs 26 may include a horizontal direction and a vertical direction, as illustrated in FIG. 1. Each PE 26 may receive an operand from one or more input vectors for an op, and may perform the specified compute operation on the operand to produce a result. Some ops may specify a vector of results, and a subset of the PEs 26 may be used for such ops. Other ops may specify an array of results. For example, in an embodiment, the multiply-accumulate operations over the vectors of input operands may produce an outer product of the vectors. Up to all of the PEs 26 may be used for such ops. However, in some cases, even the array of results may not use all of the PEs 26. For example, various operand sizes may be supported. Smaller operand sizes have more operands in a given amount of storage and thus may use more of the PEs 26 than larger operand sizes. Additionally, in some cases, not all of the vector of input operands may be used. Accordingly, ops may cause a variable amount of activity in the execute circuit 20 and thus a variable amount of change in power consumption as ops are issued into the execute pipeline implemented by the execute circuit 20.

The decode unit 14 may decode the instructions to generate the ops for the op queue 16, and may determine the PEs 26 that may be used by a given op. More particularly, in the illustrated embodiment, the decode unit 14 may determine a horizontal mask (HMask) and a vertical mask (VMask) for each operation. The HMask may indicate the PEs 26 in the horizontal direction as shown in FIG. 1 that may evaluate for the given op, and the VMask may indicate that PEs 26 in the vertical direction as shown in FIG. 1 that may evaluate for a given op. The intersection of the two masks may determine which PEs 26 will evaluate when the op is executed. For example, each mask may include a bit for each PE 26 in the given direction. The bit may be set to indicate that the PE 26 will evaluate and clear to indicate that the PE 26 will not evaluate for the op (e.g. the PE 26 will be idle and not consuming significant energy during execution of the op). In other embodiments, subsets of PEs 26 may be masked by a single mask bit if the instructions executed by the processor 10 do not have the granularity to evaluate or not evaluate single PEs. Thus, for example, an array of 8 by 8 PEs 26 may include an HMask of 8 bits and a VMask of 8 bits. If groups of 2 PEs 26 share a mask bit, the HMask and VMask would be 4 bits each. Any combination of masks may be supported in various embodiments.

In some cases, one or more pipeline stages may be bypassed for an operation. For example, in the case of a multiply-accumulate operation, some instructions may specify only the multiply but not to accumulate the results. Such an operation may be active in the multiply stages of the pipeline but not in the accumulate stages. Other instructions may specify only an accumulate (addition) operation and thus the instructions may not be active in the multiply stages by may be active in the accumulate stages. The decode unit 14 may generate bypass values for the ops, indicating which execute stages of the execute pipeline 20 are bypassed by a given op (not active in those stages).

As illustrated in FIG. 1, the decode unit 14 includes a score generation circuit 24A. The score generation circuit 24A may be logically part of the power control circuit 24, but may be located in the decode unit 14 so that scores for each op may be generated as the ops are decoded. The score for each op may indicate what fraction of the PEs 26 are used by a given op, which is a measure of how much activity the op generates in the execute pipeline for the execute circuit 20. The highest score may indicate that all the PEs are used, and lower scores may indicate that some fraction of the PEs are used. The score may be generated based on the HMask and VMask for the op, as well as operand sizes and other factors that may determine the number of active PEs for an op. In an embodiment, any subset of the PEs 26 may be supported in the score. In other embodiments, limited subsets of the PEs 26 may be supported in the score. For example, in an embodiment in which there are 64 PEs, the score may be encoded as a fixed point 1.5 format (one unit bit and 5 fractional bits). A score of 1.00000 (binary) may indicate all PEs are active. A score of 0.11111 (binary) may indicate $^{31}/_{32}$ of the PEs are active, etc.

The op queue 16 stores the ops until the ops may be executed by the execute circuit 20. Two exemplary op queue entries are shown in FIG. 1, although any number of entries may be supported in other embodiments. Each entry may include the op (including the operand specifiers identifying locations in the data buffer 18 from which the operands will be read, destination specifiers, etc.). Additionally, the HMask, VMask, bypass, and score are shown for each op. Various other information may be stored in each op queue entry for other purposes, as desired in various embodiments. The ops may wait for their operands to be ready, for example, and may be selected for issue to the execute circuit 20 once the operands are available (e.g. in the data buffer 18 or for bypass as the ops issue to the data buffer 18 and read their operands). Other conditions may control issue as well, e.g. older ops may be favored for issue over younger ops, etc. The scheduler circuit 22 may be responsible for determining which ops are available to issue and scheduling the ops for issue.

Figure 2:
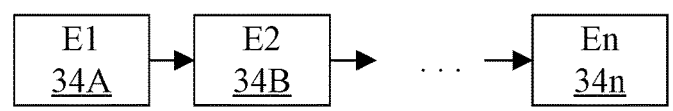
FIG. 2 is a block diagram of one embodiment of an execute pipeline.

The power control circuit 24 may inhibit the issuance of ops from the op queue 16 to control the rate of change in the power consumption of the execute circuit 20. Thus, the power control circuit 24 may be an input to the scheduler circuit 22 for making scheduling decisions. More particularly, the power control circuit 24 may be programmable with a set of weights 28, a maximum increment 30, and a decay factor 32. The set of weights 28 may include a weight for each stage in the pipeline implemented by the execute circuit 20. For example, in FIG. 2, an execute pipeline include execute stages E1 34A, E2 34B, to En 34*n* is shown. The execute pipeline may have any number of stages in various embodiments. For example, in embodiments in which the PEs 26 perform multiply-accumulate operations, the execute pipeline may include one or more multiply stages and one or more accumulate stages.

The values of the weights may be relative measure of the power consumed in each pipeline stage 34A-34*n*, relative to the other stages. For example, if a first stage has a weight of 3 and a second stage has a weight of 1, the first stage consumes approximately 3 times the amount of power as the second stage. As an op flows through the stages, the weight for each stage multiplied by the score for the op may be a representation of the amount of power consumed by the op in that stage. The weighted scores for ops that are in different stages of the execute pipeline in the same clock cycle may be summed to produce a value representing the current power consumption in the execute pipeline. Similarly, the power control circuit 24 may generate a value representing the power consumption that would result if a given op were issued into the first execute stage of the pipeline. Together, the value and the weighted sum for the pipeline may represent the instantaneous power consumption that would result if the given op were to be issued.

The power control circuit 24 may also track a time average of the power consumption in previous clock cycles, decaying based on the decay factor 32. By inhibiting issuance of ops that would increase the power consumption more than a maximum increment 30 over the decaying average, the power control circuit 24 may control the rate of change of power consumption (and thus the rate of change of the supply current) to help ensure correct operation by reducing voltage droop that might occur during operation. The maximum increment 30 may thus represent a maximum current increase that the power control circuit 24 is designed to permit.

In some embodiments, the power control circuit 24 may also control the maximum power consumption of the execute circuit 20 (not shown in FIG. 1), also to mitigate the voltage droop that may occur when power consumption exceeds a certain fixed level. The maximum power consumption control may be independent of the rate of change control, and may also be used to inhibit issuance of ops. In the case of maximum power consumption control, if op issue is inhibited, the inhibition may prevent any op issue for one or more clock cycles. In contrast, the rate of change control described herein may selectively prevent certain ops that would rapidly change power consumption from issuing for one or more clock cycles, while permitting other ops to be issued.

Figure 3:
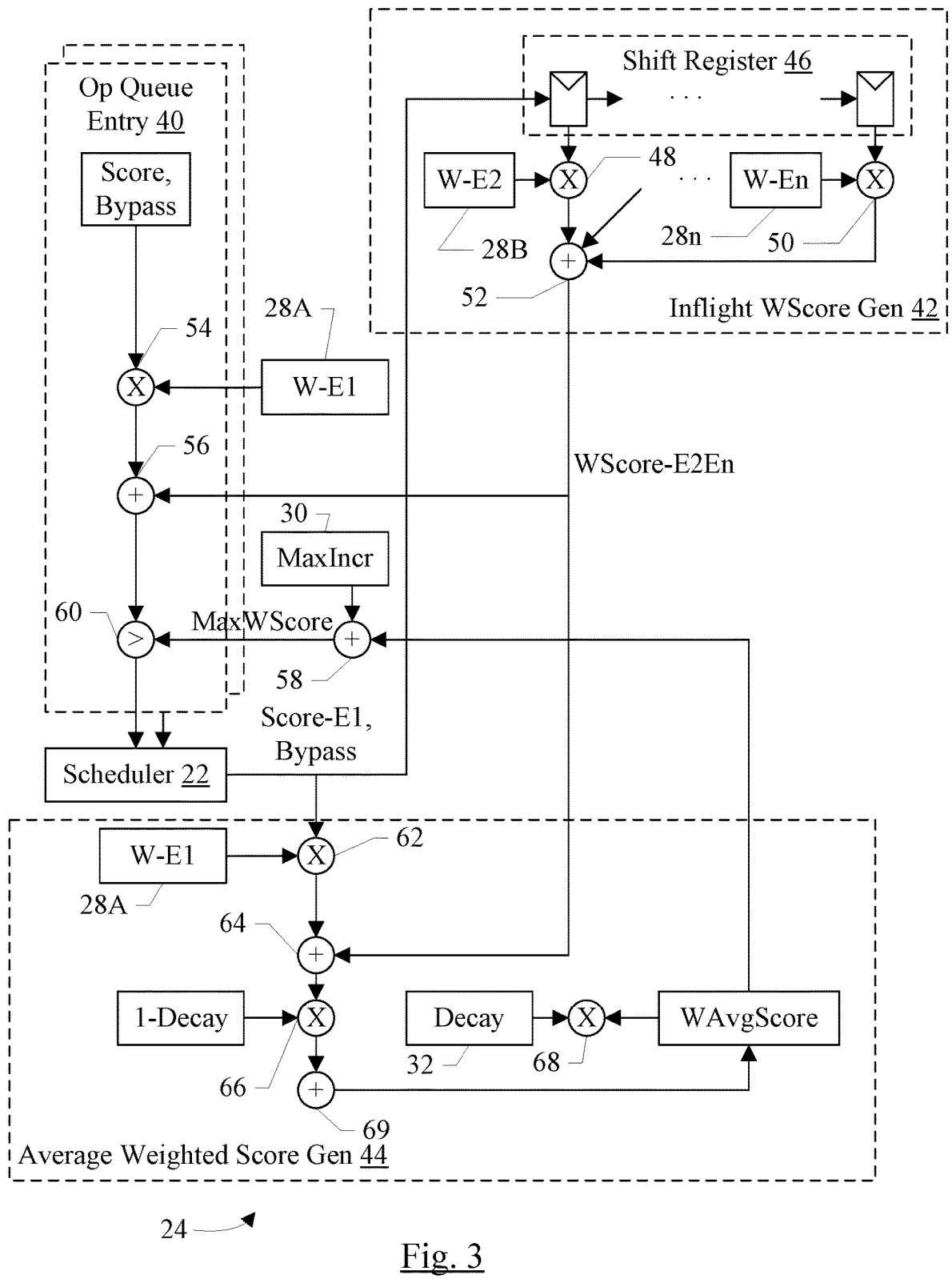
FIG. 3 is a block diagram of one embodiment of a power control circuit.

FIG. 3 is a block diagram illustrating one embodiment of the power control circuit 24. An op queue entry 40 is shown, which may be one of the op queue entries from the op queue 16 shown in FIG. 1. There may be similar circuitry for each other op queue entry as well (illustrated in FIG. 3 with overlapping dotted boxes under the op queue entry 40). The scheduler circuit 22 is shown in FIG. 3 as well, and the power control circuit 24 may provide enables for each op queue entry 40 to the scheduler circuit 22, indicating which entries are enabled for scheduling from the point of view of power control. Other factors used in scheduling ops may be managed by the scheduler circuit 22 (e.g. availability of the operands, ordering concerns, etc.). As shown in FIG. 1, the power control circuit 24 may include an inflight weighted score generation circuit 42 and a weighted average score generation circuit 44. Shown in FIG. 3 are the programmable weights 28 (e.g. weight 28A for execute stage E1, width 28B for execute stage E2, through weight 28*n* for execute stage En). Weight 28A is shown in two locations in FIG. 3 for convenience in the drawing, however the weight 28A may actually be stored once in the power control circuit 24 in implementation.

The inflight weighted score generation circuit 42 may generate a weighted score for the ops that are inflight in the execute pipeline (e.g. stages E2 to En). That is, the weighted score generated by the inflight weighted score generation circuit may represent the energy consumption of the ops that will be in the pipeline when a currently issued op reaches the E1 execute stage. Accordingly, the inflight weighted score generation circuit 42 may include a shift register 46 having locations for each pipeline stage E2 to En. Each clock cycle of the clock for the execute circuit 20, the shift register 46 may shift the score and bypass values for each by one stage, reflecting the passage of the ops through the execute pipeline. The score and bypass values for the ops in each stage may be multiplied by the weight for that stage. For example, the weight 28B for stage E2 may be multiplied by the score and bypass values for the op in E2 via multiplier 48 and the weight and bypass values for stage En via the multiplier 50. Other stages between E2 and En may similarly be multiplied via other multipliers, represented by the ellipses in FIG. 3. If the bypass value indicates that the op bypasses the current stage, the multiplier may output a zero (reflecting no power consumption for the stage for the clock cycle). Otherwise, the multiplier may output the product of the weight for the stage and the score. The weighted scores may be provided to an adder 52, which may add the weighted scores to produce a weighted score representing stages E2 through En (Wscore-E2En in FIG. 3). The WScore-E2En may be provided to the power control circuitry for each op queue entry 40 and to the average weighted score generation circuit 44.

For each op queue entry 40, the power control circuit 24 may multiply the score and bypass values by the weight for stage E1 to determine the amount of power that would be consumed in the first execute stage if the op were to be issued (e.g. multiplier 54 in FIG. 3). Similar to the discussion above for stages E2 to En, the multiplier 54 may produce a zero if the bypass value indicates that the op bypasses stage E1, but otherwise may produce the weighted score for E1 if the op were to be issued. The weighted score may be added (adder 56 in FIG. 1) to the WScore-E2En to generate the weighted score for the execute pipeline, representing the power that would be consumed when the op reaches the E1 stage if the op were issued.

The power control circuit 24 may be configured to compare the weighted score from the adder 56 to the sum (from the adder 58) of the average weighted score from the average weighted score generation circuit 44 and the maximum increment 30. The sum of the average weighted score and the maximum increment may be the maximum weighted score for an op that may be enabled for issue. Accordingly, if the total weighted score from the adder 56 is less than the maximum weighted score (comparator 60), the power control circuit 24 may enable the op for issue. If the total weighted score for the adder 56 is greater than the maximum weighted score, the power control circuit 24 may inhibit the op from issuance. Ops that are inhibited may not be issued by the scheduler circuit 22 even if those ops are otherwise ready to issue. Thus, power consumptions significantly higher than the previous power consumptions (as represented by the average weighted score) may be delayed to reduce the rate of change in power consumption.

When scheduler circuit 22 issues an op, the score and bypass data for that op are considered to be in stage E1 for purposes of power control circuit 24. It is noted that the op may not reach the E1 stage for one or more clock cycles since the op reads the data buffer 18 before reaching the execute circuit 20, but for purposes of power control they delay may be ignored because the rate of change in power will still occur as the ops each reach their designated stages in later clock cycles. The relative distance in time between issuing ops that will consume certain amounts of power is controlled by the power control circuit 24, not the precise clock cycles in which those power consumptions occur, in this embodiment.

The score and bypass values for E1 may be provided to the shift register 46 to be shifted into the E2 stage in the next clock cycle, and may also be provided to the average weighted score generation circuit 44. The average weighted score generation circuit 44 may multiply the score and bypass values by the weight for execute stage E1 (multiplier 62), producing the weighted score for execute stage E1 for this clock cycle. The weighted score may be added to the WScore-E2En (adder 64) to produce the total weighted score for this clock cycle. It is noted that the value produced by the adder 64 may be the same as the value produced by the adder 56 in the op queue entry 40 from which the op is issued. Thus, in another embodiment, the scheduler circuit 22 may provide the total weighted score for the issued op to the average weighted score generation circuit 44.

The average weighted score generation circuit 44 may maintain a moving average of the total weighted scores from previous clock cycles, decaying according to a programmable decay factor 32. The decay factor 32 may be a fraction between 0 and 1 (excluding one), and may effectively be a measure of how long the previous total weighted scores continue to affect the average weighted score. A decay factor near 1 may cause the previous weighted scores to significantly affect the average weighted score for a long period of time. A fraction of zero would not retain the previous weighted scores at all. Fractions in between may balance the previous weighted scores and the current weighted score.

The average weighted score generation circuit 44 may multiply the total weighted score for the currently issuing op by one minus the decay factor 32 (multiplier 66) and the current average weighted score by the decay factor 32 (multiplier 68). The adder 69 may sum the products to produce the next average weighted score.

Generally, the average weighted score may provide a measure of the recent history of power consumption, providing some smoothing of high power consuming ops that may be issued from time to time and thus helping to more slowly ramp the power consumption if numerous high power consuming ops are provided for issuance.

Figure 4:
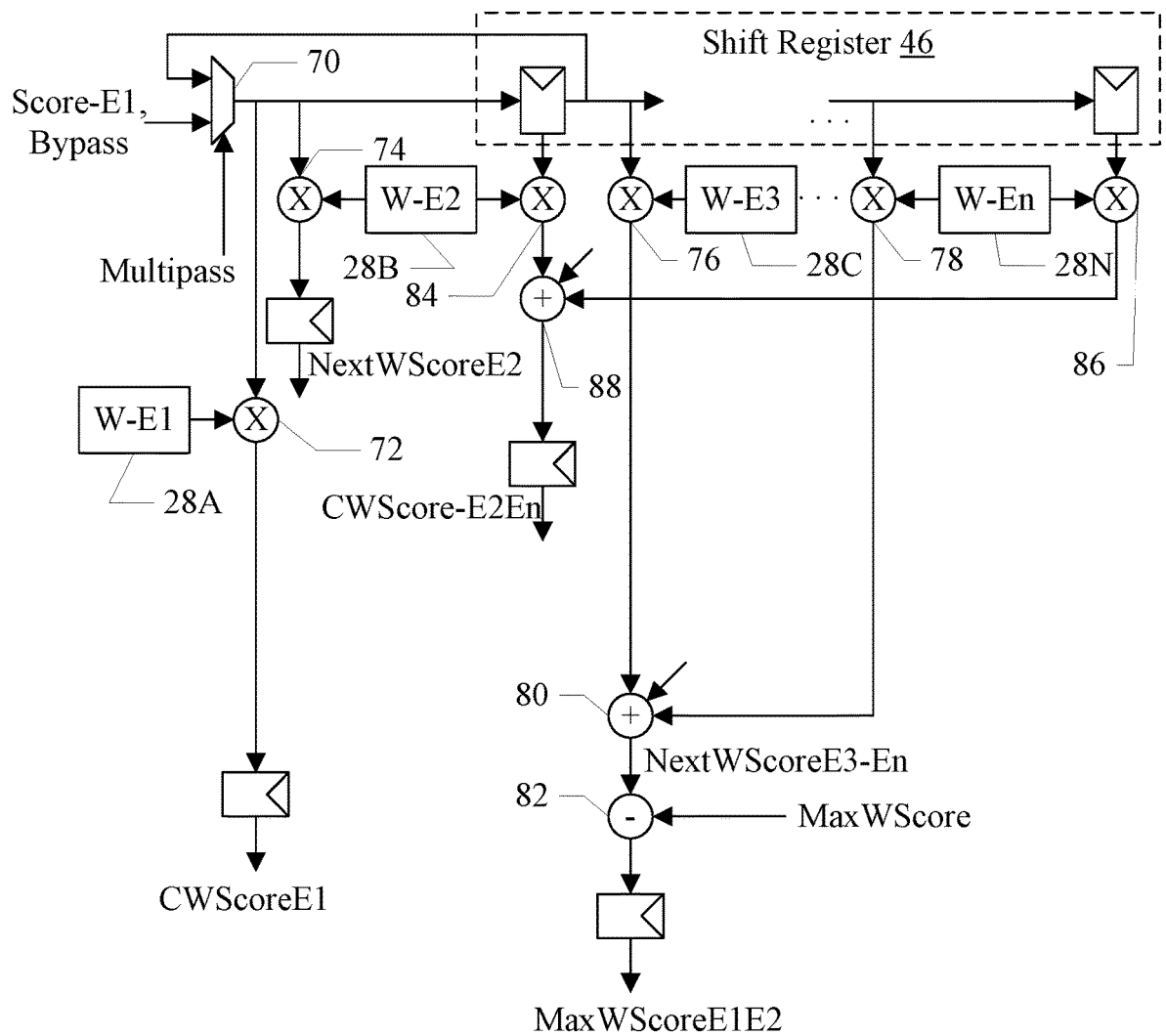
FIG. 4 is a block diagram of another embodiment of an inflight weighted score circuit shown in FIG. 3.
Figure 5:
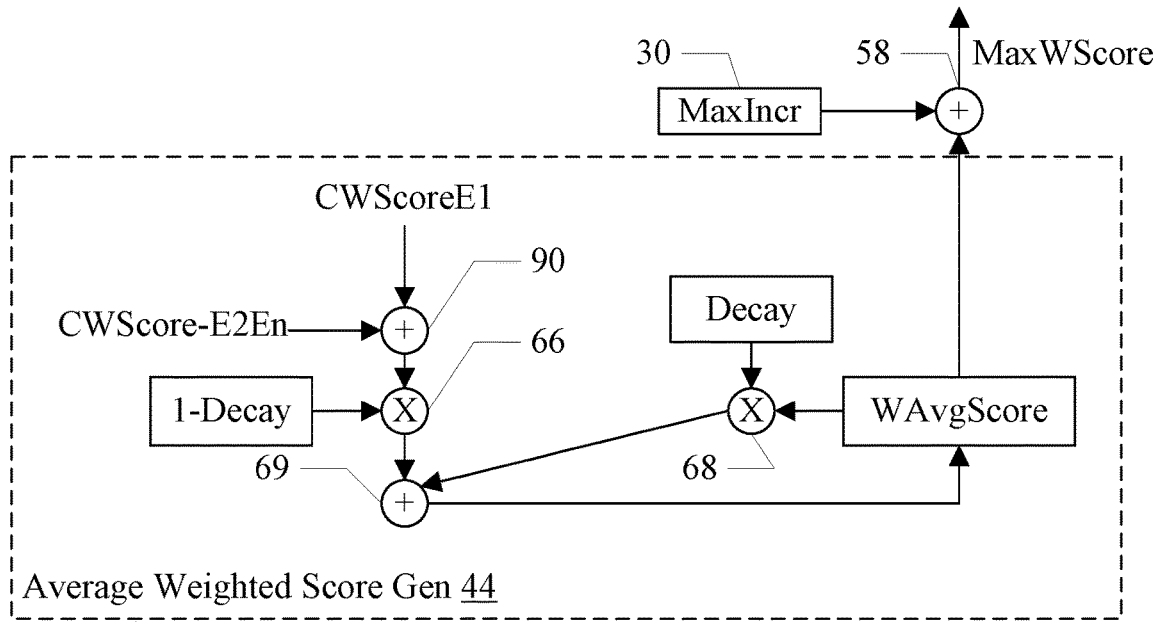
FIG. 5 is a block diagram of another embodiment of a weighted average score generation circuit shown in FIG. 3.
Figure 6:
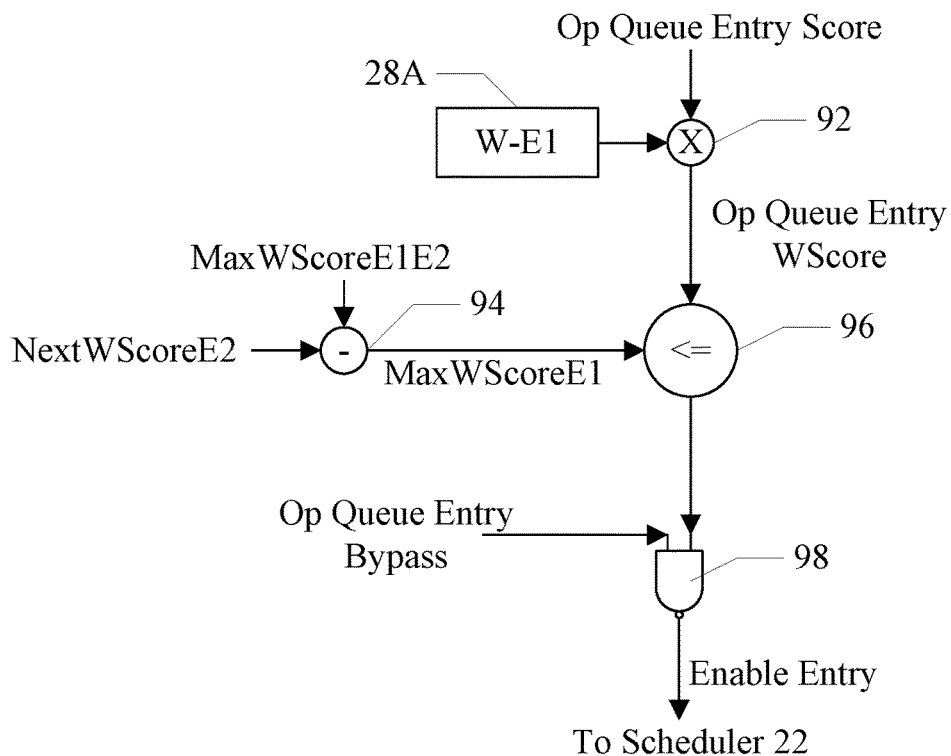
FIG. 6 is a block diagram of one embodiment of a scheduler determining eligible operation queue entries for scheduling based on the power control circuit.

The scores and bypass values for the ops that are in the execute pipeline (e.g. in the shift register 46) may be available early in a clock cycle (from a timing perspective), while the score and bypass values for the currently issuing op may be available later in time because the scheduler circuit 22 may evaluate various ready conditions (including the condition from the power control circuit 24) before issuing an op and thus providing the score and bypass values. To alleviate the timing issue, another embodiment of the power control circuit 24 may precompute the values that are available early in the clock cycle and use them to simplify the operation performed on the late values. FIGS. 4-6 illustrate such an implementation.

FIG. 4 is a block diagram illustrating the computations related to the total weighted score corresponding to an issued op, for one embodiment. In the embodiment of FIG. 4, a current weighted score for execute stage E1 may be determined based on the issued op (CWScoreE1) and a score for execute stage E2 may be determined for the next clock cycle as well (NextWScoreE2). The score and bypass values for the op issued to execution stage E1 (output of multiplexor 70 in FIG. 4) may be multiplied by the weight for execute stage E1 28A (multiplier 72) to generate CWScoreE1. The same score and bypass values may be multiplied by the weight for execute stage E2 28B (multiplier 74) to produce the weighted score for the execute stage E2 for the next clock cycle (NextWScoreE2).

The remaining portion of the inflight weighted score for the next clock cycle, for execute stages E3 to En (NextWScoreE3-En) may similarly be calculated by multiplying the corresponding weights by the score and bypass values from the shift register locations for the preceding stages (e.g. multipliers 76 and 78 in FIG. 4, and similar multipliers for other stages not shown in FIG. 4) and adding the weighted scores (adder 80 in FIG. 4). Subtracting NextWScoreE3-En from the maximum weighted score (MaxWScore) provides the maximum weighted score for the E1 and E2 stages for the next clock cycle (MaxWScoreE1E2 in FIG. 4, subtraction circuit 82). Viewed in another way, the sum of the weighted scores is logically compared to the MaxWScore. Precomputing the total weighted score for stages E3 to En and subtracting it from the MaxWScore leaves the total remaining score that may be generated from execute stages E1 and E2 in the next clock cycle without exceeding the MaxWScore. Note that the MaxWScore is the sum of the average weighted score and the maximum increment 30, which may be calculated in a timing optimized fashion as shown in FIG. 5 and is also shown in FIG. 3 input to the comparator 60.

Additionally, the current weighted score for execute stages E2 to En (CWScore-E2En) may be calculated in a manner similar to the inflight weighed score generation circuit 42, by multiplying the weights for each stage by the score and bypass values for the corresponding stages (rather than the previous stages), and adding the results (e.g. multipliers 84 and 86 for stages E2 and En and similar multipliers for other stages, not shown in FIG. 4, and adder 88).

FIG. 4 also illustrates another feature of one embodiment. Some ops may be performed as multiple passes through the execute pipeline. For multipass ops, the score and bypass values shifted into the E2 location in the shift register 46 may be selected through the mux 70 in the next clock cycle via the multipass control signal on the mux 70. Thus, the same score and bypass values may be provided again in the subsequent clock cycle. The mux 70 may be controlled in this fashion for as many subsequent clock cycles as there are additional passes. For example, a two pass op would select the E2 values through the mux 70 once. A three pass op would select the E2 values through the mux 70 in two subsequent clock cycles, etc. When multipass ops are selected, the scheduler circuit 22 may not be able to schedule another op for execution until the multiple passes have been completed. Since the scheduler circuit 22 scheduled the multipass op, the scheduler circuit 22 may be aware of the multipass behavior and may use the multipass behavior to prevent scheduling until the passes have been accounted for.

In an embodiment, the execute circuit 20 may support parallel execution of two or more ops that use different subsets of the PEs 26. In such embodiments, multiple copies of the inflight weighted score generation circuit 42 may be provided to track the multiple ops (or the corresponding timing-optimized versions illustrating in FIGS. 4-6 may be provided) to track the parallel. The outputs of the circuits may be added to produce the total weighted score for the pipeline.

FIG. 5 illustrates another embodiment of the average weighted score generation circuit 44 using the precomputed values from the embodiment of FIG. 4 to generate the current weighted score. The adder 64 may add the current weighted score for execute stage E1 (CWScoreE1) to the current weighted score for the remaining stages (CWScore-E2En) to produce the total weighted score as an input to the multiplier 66. The remainder of the average weighted score generation circuit 44 may be similar to the embodiment of FIG. 3. Additionally, the average weighted score thus generated may be added to the maximum increment 30 (adder 58) in a fashion similar to the embodiment of FIG. 3 to generate the MaxWScore.

FIG. 6 illustrates one embodiment of the logic for determining if an op in an op queue entry 40 is enabled by the power control circuit 24 for issuance by the scheduler circuit 22. The multiplier 92 may multiply the weight for the execute stage E1 28A by the score in the op queue entry, producing the weighted score for the op queue entry if the op were to be issued. The subtraction circuit 94 may subtract the next weighted score for execution stage E2 (NextWScoreE2) from the maximum weighted score for E1 and E2 (MaxWScoreE1E2), resulting in the maximum weighted score for E1 (MaxWScoreE1). The comparator 96 may compare MaxWScoreE1 to the op queue entry weighted score. If the op queue entry weighted score is less than or equal to the MaxWScoreE1, the op may be eligible for issuance. Additionally, if the bypass value indicates that the op bypasses the E1 stage, the op queue entry may be enabled even if the op queue weighted score exceeds the MaxWScoreE1 (NAND gate 98). The NAND gate 98 may be the equivalent or producing a zero from the multiplier 92 if the bypass value indicates bypass, as described above with regard to FIG. 3.

Figure 7:
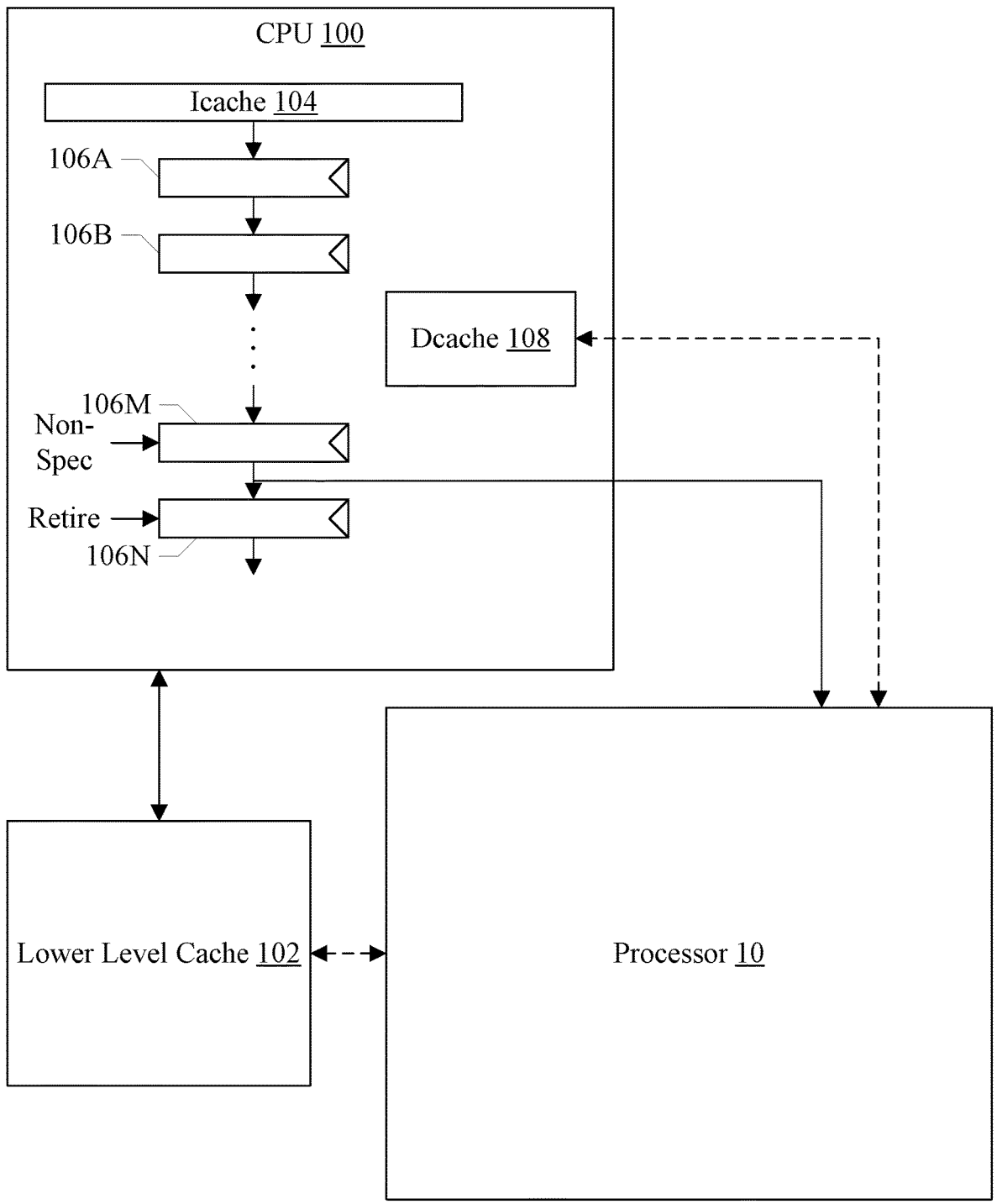
FIG. 7 is a block diagram of one embodiment of the processor shown in FIG. 1 used as a coprocessor for a central processing unit (CPU) processor.

Turning now to FIG. 7, a block diagram of one embodiment of an apparatus including a central processing unit (CPU) 100, the processor 10, and a lower level cache 102 is shown. In the illustrated embodiment, the CPU 100 is coupled to the lower level cache 102 and the processor 10. In some embodiments, the processor 10 may be coupled to the lower level cache 102 as well, and/or may be coupled to a data cache (DCache) 108 in the CPU 100. The CPU 100 may further include an instruction cache (ICache) 104 and one or more pipeline stages 106A-106N. The pipeline stages 106A-106N may be coupled in series.

The processor 10 may be a coprocessor to the CPU 100 in the embodiment of FIG. 7. Thus, the processor 10 may employ an instruction set, which may be a subset of the instruction set implemented by the CPU 100. The CPU 100 may recognize instructions implemented by the processor 10 and may communicate the instructions to the processor 10.

In the illustrated embodiment, the CPU 100 is responsible for fetching the processor 10 instructions and transmitting the instructions to the processor 10 for execution. The overhead of the "front end" of the CPU 100 fetching, decoding, etc. the instructions may be amortized over the computations performed by the processor 10. In one embodiment, the CPU 100 may be configured to propagate the instructions down the pipeline (illustrated generally in FIG. 7 as stages 106A-106N) to the point at which the instruction becomes non-speculative. In FIG. 7, the stage 106M illustrates the non-speculative stage of the pipeline. From the non-speculative stage, the instruction may be transmitted to the processor 10. The CPU 100 may then retire the instruction (stage 106N). Particularly, the CPU 100 may retire the instruction prior to the processor 10 completing the computation (or even prior to starting the computation).

In the case of memory instructions that are to be transmitted to the processor 10, the processing in the CPU 100 may include translating the virtual address of the memory operation to a physical address (including performing any protection checks and ensuring that the memory instruction has a valid translation).

FIG. 7 illustrates a communication path between the CPU 100 (specifically the non-speculative stage 106M) and the processor 10. The path may be a dedicated communication path, for example if the processor 10 is physically located near the CPU 100. The communication path may be shared with other communications, for example a packet-based communication system could be used to transmit memory requests to the system memory and instructions to the processor 10. The communication path could also be through system memory, for example the computation engine may have a pointer to a memory region into which the CPU 100 may write computation instructions. The processor 10 may read the instructions from the memory region. In yet another alternative, the CPU 100 may be configured to provide the program counter (PC) address from which to fetch the instruction to the processor 10. In still another embodiment, the CPU 100 may execute one or more instructions to generate an instruction for the processor 10 (e.g. writing the data forming the instruction to a register) and one or more additional instructions to issue the instruction from the register to the processor 10.

The instruction cache 104 and data cache (DCache) 108 may each be a cache having any desired capacity, cache line size, and configuration. Similarly, the lower level cache 102 may be any capacity, cache line size, and configuration. The lower level cache 102 may be any level in the cache hierarchy (e.g. the last level cache (LLC) for the CPU 100, or any intermediate cache level).

Figure 8:
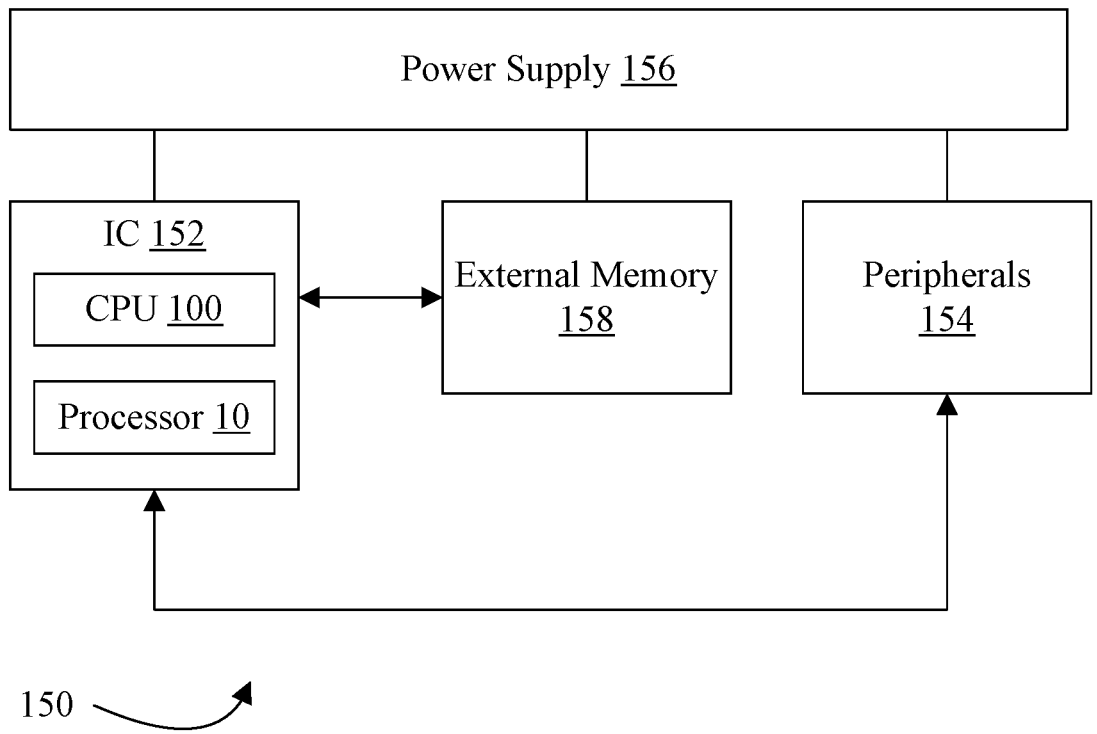
FIG. 8 is a block diagram of one embodiment of a system including the processor and the CPU shown in FIG. 7.

FIG. 8 is a block diagram of one embodiment of a system 150. In the illustrated embodiment, the system 150 includes at least one instance of an integrated circuit (IC) 152 coupled to one or more peripherals 154 and an external memory 158. A power supply 156 is provided which supplies the supply voltages to the IC 152 as well as one or more supply voltages to the memory 158 and/or the peripherals 154. The IC 152 may include one or more instances of the CPU 100 and one or more instances of the processor 10. In other embodiments, multiple ICs may be provided with instances of the CPU 100 and/or the processor 10 on them.

The peripherals 154 may include any desired circuitry, depending on the type of system 150. For example, in one embodiment, the system 150 may be a computing device (e.g., personal computer, laptop computer, etc.), a mobile device (e.g., personal digital assistant (PDA), smart phone, tablet, etc.), or an application specific computing device capable of benefiting from the processor 10 (e.g., neural networks, LSTM networks, other machine learning engines including devices that implement machine learning, etc.). In various embodiments of the system 150, the peripherals 154 may include devices for various types of wireless communication, such as wifi, Bluetooth, cellular, global positioning system, etc. The peripherals 154 may also include additional storage, including RAM storage, solid state storage, or disk storage. The peripherals 154 may include user interface devices such as a display screen, including touch display screens or multitouch display screens, keyboard or other input devices, microphones, speakers, etc. In other embodiments, the system 150 may be any type of computing system (e.g. desktop personal computer, laptop, workstation, net top etc.).

The external memory 158 may include any type of memory. For example, the external memory 158 may be SRAM, dynamic RAM (DRAM) such as synchronous DRAM (SDRAM), double data rate (DDR, DDR2, DDR3, etc.) SDRAM, RAMBUS DRAM, low power versions of the DDR DRAM (e.g. LPDDR, mDDR, etc.), etc. The external memory 158 may include one or more memory modules to which the memory devices are mounted, such as single inline memory modules (SIMMs), dual inline memory modules (DIMMs), etc. Alternatively, the external memory 158 may include one or more memory devices that are mounted on the IC 152 in a chip-on-chip or package-on-package implementation.

Figure 9:
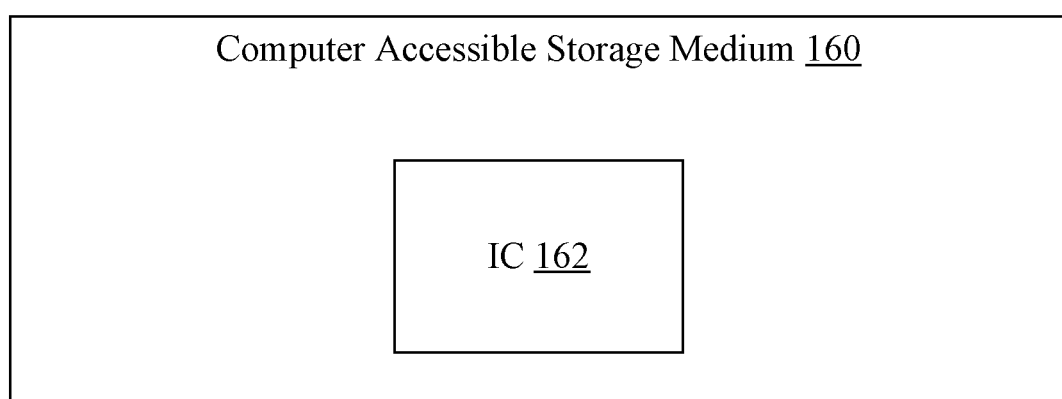
FIG. 9 is a block diagram of one embodiment of a computer accessible storage medium.

FIG. 9 is a block diagram of one embodiment of a computer accessible storage medium 160 is shown storing an electronic description of the IC 152 (reference numeral 162) and/or one or more code sequences 164. More particularly, the description may include at least the processor 10 and/or the CPU 100. Generally speaking, a computer accessible storage medium may include any storage media accessible by a computer during use to provide instructions and/or data to the computer. For example, a computer accessible storage medium may include storage media such as magnetic or optical media, e.g., disk (fixed or removable), tape, CD-ROM, DVD-ROM, CD-R, CD-RW, DVD-R, DVD-RW, or Blu-Ray. Storage media may further include volatile or non-volatile memory media such as RAM (e.g. synchronous dynamic RAM (SDRAM), Rambus DRAM (RDRAM), static RAM (SRAM), etc.), ROM, or Flash memory. The storage media may be physically included within the computer to which the storage media provides instructions/data. Alternatively, the storage media may be connected to the computer. For example, the storage media may be connected to the computer over a network or wireless link, such as network attached storage. The storage media may be connected through a peripheral interface such as the Universal Serial Bus (USB). Generally, the computer accessible storage medium 160 may store data in a non-transitory manner, where non-transitory in this context may refer to not transmitting the instructions/data on a signal. For example, non-transitory storage may be volatile (and may lose the stored instructions/data in response to a power down) or non-volatile.

Generally, the electronic description 162 of the IC 152 stored on the computer accessible storage medium 160 may be a database which can be read by a program and used, directly or indirectly, to fabricate the hardware comprising the IC 152. For example, the description may be a behavioral-level description or register-transfer level (RTL) description of the hardware functionality in a high level design language (HDL) such as Verilog or VHDL. The description may be read by a synthesis tool which may synthesize the description to produce a netlist comprising a list of gates from a synthesis library. The netlist comprises a set of gates which also represent the functionality of the hardware comprising the IC 152. The netlist may then be placed and routed to produce a data set describing geometric shapes to be applied to masks. The masks may then be used in various semiconductor fabrication steps to produce a semiconductor circuit or circuits corresponding to the IC 152. Alternatively, the description 162 on the computer accessible storage medium 300 may be the netlist (with or without the synthesis library) or the data set, as desired.

While the computer accessible storage medium 160 stores a description 162 of the IC 152, other embodiments may store a description 162 of any portion of the IC 152, as desired (e.g. the computation engine 10 and/or the processor 12, as mentioned above).

Figure 10:
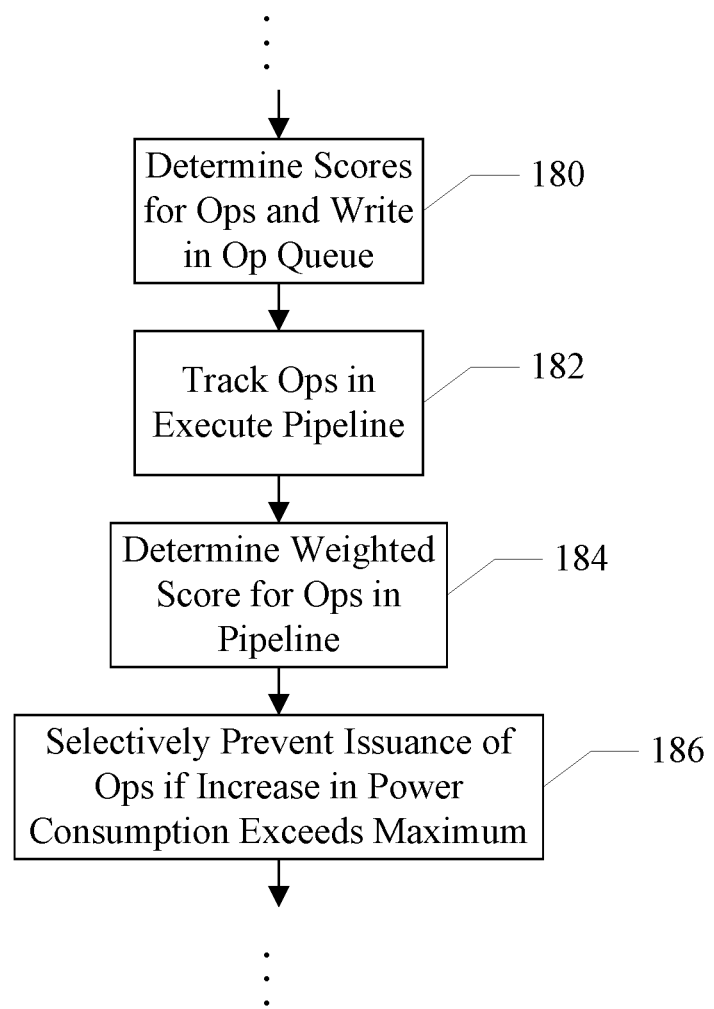
FIG. 10 is a flowchart of one embodiment of a method.

FIG. 10 is a flowchart illustrating an exemplary method in accordance with an embodiment of this disclosure. While the blocks are shown in a particular order for ease of understanding, other orders may be used. Blocks may be performed in parallel and/or pipelined over multiple clock cycles.

The method may include determining a score for each operation that is to be executed in a pipeline of the execute circuit 20 (block 180). The score may indicate a relative amount of activity caused by the operation in the pipeline. The op and the score may be written to the op queue 16. The method may further include tracking a plurality of operations in the pipeline, where each of the plurality of operations is in a different stage of a plurality of stages of the pipeline (block 182). For example, the scores for each op may be shifted through a shift register representing the stages of the pipeline. The method may include determining a first weighted score indicating a current power consumption of the plurality of operations in the pipeline responsive to scores for the plurality of operations and weights indicating relative power consumption in the plurality of stages (block 184). The method may include selectively preventing issuance of a first operation into the pipeline responsive to an increase in power consumption from a weighted average of preceding power consumptions being greater than a predetermined value (block 186). The increase would occur responsive to the issuance of the first operation. The change in power consumption is based on a weight for an initial stage of the pipeline and the score for the first operation along with the current power consumption of ops in the pipeline.

In an embodiment, the method further includes, responsive to issuance of the first operation, updating the weighted average of preceding power consumptions to reflect the issuance. In an embodiment, the method further includes tracking the first operation in the pipeline responsive to the issuance.

Numerous variations and modifications will become apparent to those skilled in the art once the above disclosure is fully appreciated. It is intended that the following claims be interpreted to embrace all such variations and modifications.

What is claimed is:

1. An apparatus comprising:
   an execute circuit configured to execute operations, wherein the execute circuit comprises a pipeline comprising a plurality of pipeline stages, wherein a given operation is processed in at least a portion of the pipeline stages;
   a queue circuit configured to store a plurality of operations to be processed in the pipeline;
   a scheduler circuit coupled to the queue circuit and configured to schedule the plurality of operations for issuance into the pipeline; and
   a power control circuit coupled to the queue circuit and the scheduler circuit, wherein the power control circuit is configured to:
      compute a score for a respective operation of the plurality of operations indicating an amount of activity that the respective operation causes in the pipeline during execution, wherein a first weighted score of previously-issued operations in the pipeline represents a first energy consumption in the pipeline, and wherein a total weighted score of the previously-issued operations and the respective operation represents a potential energy consumption that would occur if the respective operation were issued in a clock cycle;
      inhibit issuance of the respective operation in the clock cycle responsive to the potential energy consumption exceeding a decaying average of previous energy consumptions by more than a predetermined amount; and
      track a progression of the previously-issued operations in the pipeline to generate data for determining the issuance or inhibition of issuance of the respective operation.

2. The apparatus as recited in claim 1 wherein the predetermined amount represents a maximum change in supply current to the execute circuit that the apparatus is designed to permit.

3. The apparatus as recited in claim 1 wherein the decaying average is determined based on a programmable decay factor.

4. The apparatus as recited in claim 1 wherein a first operation of the plurality of operations is executed in a plurality of passes through the pipeline, wherein the power control circuit is configured to re-insert the score for the first operation in the first weighted score for a plurality of clock cycles to track the plurality of passes.

5. The apparatus as recited in claim 4 wherein the scheduler circuit does not issue another operation of the plurality of operations during the plurality of clock cycles because the first operation is occupying the pipeline.

6. The apparatus as recited in claim 1 wherein each respective operation includes a bypass value indicating whether or not the respective operation bypasses one or more of the plurality of pipeline stages, and wherein the power control circuit is configured to count a zero for the respective operation when it is in a first pipeline stage of the plurality of pipeline stages that the respective operation bypasses according to the bypass value.

7. The apparatus as recited in claim 1 wherein each respective operation includes a mask value representing an amount of circuitry in each pipeline stage of the plurality of pipeline stages that is activated by the respective operation, wherein the power control circuit is configured to incorporate the mask value in determining the score for the respective operation.

8. The apparatus as recited in claim 7 wherein the execute circuit comprises an array of processing elements, each processing element configured to operate on one of a plurality of values from each operand of the respective operation, and wherein the mask value indicates a number of the processing elements that are active for the respective operation.

9. The apparatus as recited in claim 8 wherein the mask value includes a vertical mask indicating active processing elements in a vertical direction in the array of processing elements and a horizontal mask indicating active processing elements in a horizontal direction in the array of processing elements.

10. The apparatus as recited in claim 1 wherein the power control circuit comprises a shift register having locations corresponding to the plurality of pipeline stages, wherein the locations store the scores for the previously-issued operations, wherein the shift register shifts the scores between the locations in the shift register to track the previously-issued operations through the plurality of pipeline stages, and wherein the power control circuit is configured to determine components of the total weighted score responsive to the shift register and a plurality of weights corresponding to the plurality of pipeline stages, wherein a given weight of the plurality of weights represents a relative amount of energy consumption in a given stage of the plurality of pipeline stages with respect to other stages of the plurality of pipeline stages.

11. An apparatus comprising:
   an execute circuit configured to execute operations, wherein the execute circuit comprises a pipeline comprising a plurality of pipeline stages, wherein a given operation passes through the plurality of pipeline stages during execution;

a queue circuit configured to store a plurality of operations to be processed in the pipeline;

a scheduler circuit coupled to the queue circuit and configured to schedule the plurality of operations for issuance into the pipeline; and a power control circuit coupled to the queue circuit and the scheduler circuit, wherein the power control circuit is configured to inhibit issuance of respective operations of the plurality of operations to control changes in power consumption in the execute circuit, wherein the power control circuit is configured to inhibit issuance based on a first energy consumption in the execute circuit in a given clock cycle, a second energy consumption that would occur if the respective operation is issued in the given clock cycle, a decaying average of previous energy consumptions corresponding to previous clock cycles, and a maximum increase in energy consumption that the power control circuit is configured to permit, wherein the first energy consumption in the execute circuit is based on a score for each operation in the pipeline, the stage of the pipeline that the operation is in, and relative energy consumption of circuitry in the stage compared to other stages of the pipeline.

12. The apparatus as recited in claim 11 wherein the power control circuit includes a plurality of weights corresponding to the plurality of pipeline stages, wherein the plurality of weights represent the relative energy consumption of the plurality of pipeline stages.

13. The apparatus as recited in claim 12 wherein the power control circuit is configured to compute a score for each respective operation in the queue circuit, wherein the score represents an amount of activity caused by the respective operation during execution in the execute circuit.

14. The apparatus as recited in claim 13 wherein the score represents a portion of circuitry in each pipeline stage that evaluates in response to the respective operation.

15. The apparatus as recited in claim 14 wherein the execute circuit comprises an array of processing elements that operate on operands of the respective operation, wherein the score represents a number of the processing elements that evaluate for the respective operation.

16. The apparatus as recited in claim 15 wherein the score is based on one or more masks indicating which of the processing elements evaluate for the respective operation.

17. The apparatus as recited in claim 11 wherein each respective operation includes a bypass value identifying the plurality of pipeline stages that evaluate for the respective operation, and wherein the power control circuit is configured to account for zero energy consumption in a given stage of the plurality of pipeline stages responsive to the bypass value for a respective operation in the given stage indicating that the given stage does not evaluate for the respective operation.

18. A method comprising:

determining a score for a first operation that is to be executed in a pipeline of an execute circuit, the score indicating a relative amount of activity caused by the first operation in the pipeline;

tracking a plurality of operations in the pipeline, each of the plurality of operations in a different stage of a plurality of stages of the pipeline, wherein a given operation of the plurality of operations is processed in at least a plurality of consecutive stages of the plurality of stages in the pipeline;

determining a first weighted score indicating a current power consumption of the plurality of operations in the pipeline responsive to scores for the plurality of operations and weights indicating relative power consumption in the plurality of stages; and selectively preventing issuance of the first operation into the pipeline responsive to an increase in power consumption from a weighted average of preceding power consumptions being greater than a predetermined value, wherein the increase would occur responsive to the issuance, and wherein the increase in power consumption is based on a weight for an initial stage of the pipeline and the score for the first operation along with the current power consumption.

19. The method as recited in claim 18 further comprising, responsive to issuance of the first operation, updating the weighted average of preceding power consumptions to reflect the issuance.

20. The method as recited in claim 18 further comprising tracking the first operation in the pipeline responsive to the issuance.

* * * * *